Aug. 28, 1928.
C. T. PFLUEGER
1,682,710
SPINNER
Filed June 19, 1924
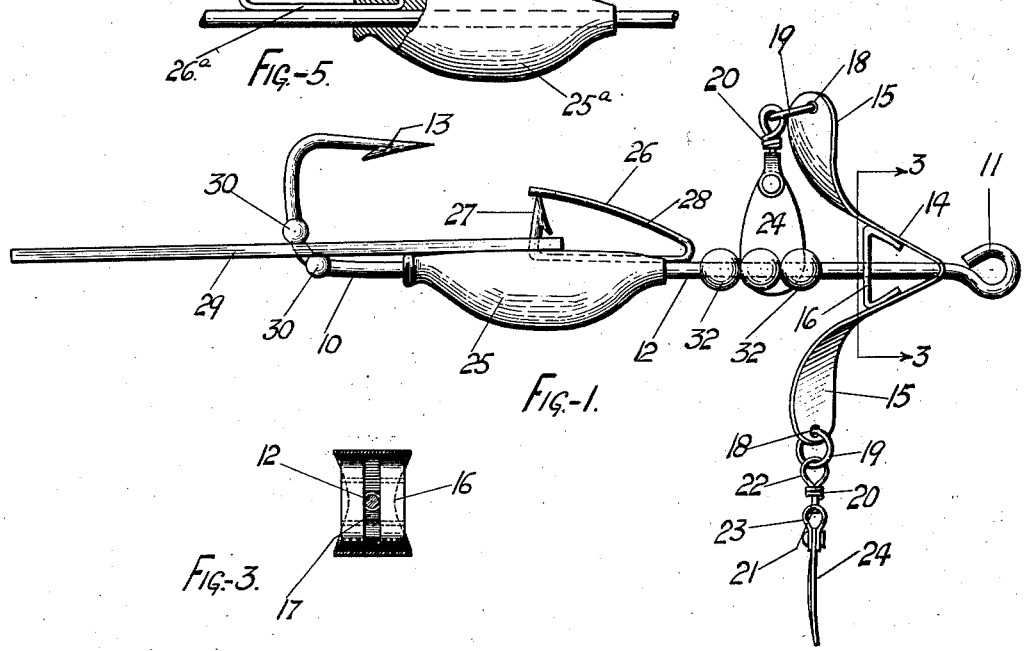
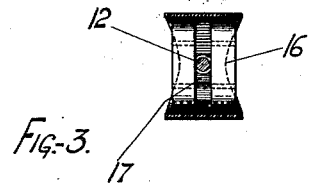
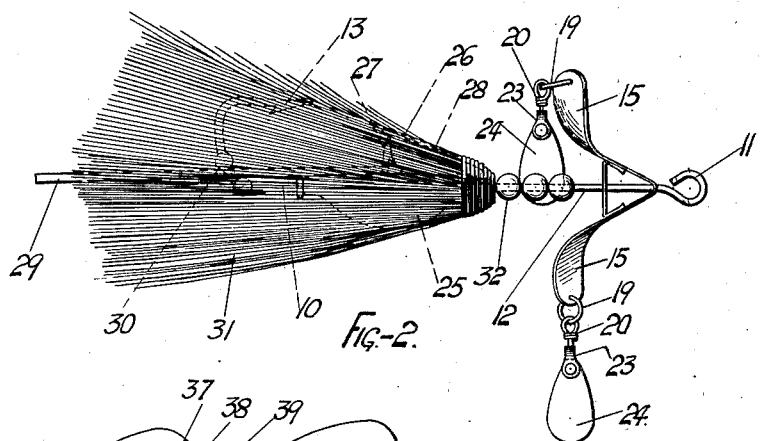
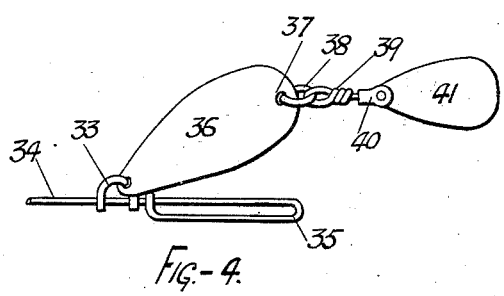
INVENTOR.
CHARLES T. PFLUEGER.
BY
ATTORNEY.

Patented Aug. 28, 1928.

1,682,710

UNITED STATES PATENT OFFICE.

CHARLES T. PFLUEGER, OF AKRON, OHIO, ASSIGNOR TO THE ENTERPRISE MANUFACTURING COMPANY, OF AKRON, OHIO, A CORPORATION OF OHIO.

SPINNER.

Application filed June 19, 1924. Serial No. 720,902.

This invention relates to fishing tackle and particularly to spinners.

The primary object of the invention is to provide an improved form of spinner which will be a more effective fish lure than types heretofore known. To this end the invention contemplates a compound spinner in which there is a main spinning element and secondary spinning elements, the latter being mounted on the main spinner and being capable of revolution therewith and also of rotation about their own axes. The invention, therefore, is directed toward a planetary system of spinning elements.

Another and an important object of the invention is to provide a revolvable spinner element which will permit wabbling of the spinner upon the shaft.

An equally important object of the invention is to provide improved means for retaining bait in proper position on a hook, said means being effective also to render the device weedless.

The above and other objects of the invention will be more readily apparent when the following description is read in connection with the accompanying drawings, it being understood that the invention is not wholly limited in the claims to the specific device shown or described.

Of the accompanying drawings:

Figure 1 is an enlarged side elevation of a spinner illustrating the invention in its preferred form without the buck tail in place;

Figure 2 is a similar view reduced in size from the above and showing a buck tail, an added attraction of the device;

Figure 3 is a section on line 3—3 of Figure 1;

Figure 4 is a detail of a modified form of spinner; and

Figure 5 is a modification of certain parts of the invention.

Referring to the drawings, 10 designates a hook formed with an eye 11, a shank 12, and a barb 13. Journaled on the shank 12 adjacent the eye 11 is a spinner 14 formed of a strip of metal bent to a V-shape and having an aperture at the vertex of the V adapted to loosely fit the shank so as to permit wabbling of the spinner. The arms 15, 15 of the V are formed as blades which are reversely curved and bent at reverse angles, as will be understood, whereby the spinner will be rotated while trolling. Extending between the blades 15 of the spinner is a brace 16 having a slot 17 therein through which the shank 12 extends so as to guide the spinner as it rotates about the shank and permit wabbling of the spinner.

Each spinner blade 15 is formed with an aperture 18 through which extends a link 19 to which is linked a combined link and swivel member 20 having a head 21 and a shank bent into an eye 22 which extends through the link 19. The swivel 20 is inserted through an aperture in a loop 23, whereby the latter is swiveled on the member 20. The loop 23 has hingedly connected thereto a second spinner 24 which is accordingly both hinged and swiveled onto the main spinner whereby it will spin upon its own axis while revolving in the orbit of the main spinner.

Formed on the shank 12 is a weight 25 of lead or the like in which is secured a bait retaining device 26 comprising a barb or prong 27 and a spring shank 28, the latter being embedded over a part of its length in the lead, the prong 27 being turned upwardly and the shank 28 being looped over so that the end opposite the prong normally lies against the point of the prong whereby when bait, such as a pork rind 29, is affixed to the hook one end thereof may be forced over the prong 27 and held thereon by the end of the shank which is adapted to be urged from the prong when forcing the bait on the prong. The looped-over portion of shank 28 is adapted to prevent the fouling of the hook 27 in weeds or the like. Further provision is made to support the bait properly on the hook by the formation of spaced stops 30, 30 thereon, over one of which the pork rind is forced, and as the bait is held at its upper end on the hook 27 and at its lower end between the stops 30, 30, the pork rind will remain in substantially the position shown in Figure 1.

The bait retaining features of the present device are covered in a divisional application hereof, Serial No. 61,709, filed October 10, 1925.

As shown in Figure 2, the hook 10 and bait retaining devices 26 and 30 are preferably covered by a buck tail or other lure 31 secured on the shank of the hook in the customary manner. The usual stops 32, 32 may be slidably mounted on the shank 12 between the spinner 14 and the buck tail 31.

In Figure 4 there is indicated a modified form of spinner constructed according to the invention. In this form a loop 33 is journaled on the shank 34 of a hook, which shank is formed with an elongated eye 35 adapted to retain the loop on the hook. The loop extends through an aperture in a main spinner 36, which latter has an aperture 37 therein corresponding to the aperture 18, a link 38 corresponding to the link 19, a combined link and swivel member 39 corresponding to the member 20, a loop 40 corresponding to the loop 23, and a second spinner 41 corresponding to the spinner 24.

In Figure 5 is shown a modified form of the device in which the weight 25ª is located on the shank of the hook nearer the eye than in the other form of the device. In this modification the lead weight is cast around the upper portion only of the bait retaining device 26ª. In this form the barb 27ª of the device 26ª is bent backwardly toward the eye of the hook and the weed guard 28ª underlies the barb. This also illustrates the body of the bait retaining device as flat instead of rounded so as to obtain a better securing of the device upon the hook. In both forms of the invention the bait retaining device is arranged to be secured to the shank of the hook by the body of the weight as it is cast around the hook.

The operation of the spinner in use will be apparent from the foregoing description, it being sufficient to say here that while the main spinner is revolving the secondary spinners move in the orbit of the main spinner and also rotate on their own axes. The main spinner will also have a wabbling movement about the shank of the hook and will be guided during such movement by the slot 17. The bait 29 will be securely held on the hook, displacement thereof being prevented by the special retaining devices described above.

Modifications of the invention other than those disclosed herein may be resorted to without departing from the spirit or scope thereof as claimed in the appended claims.

What I claim is:

1. A spinner comprising a shank, a main spinner journaled on said shank, said spinner having spaced blades, a brace between the blades having an elongated slot therein through which the shank passes, and secondary spinners swiveled on links connected to said blades.

2. A spinner comprising a shank, a main spinner journaled on said shank, said spinner having spaced blades, a brace between the blades having an elongated slot therein through which said shank extends, and secondary spinners rotatably mounted on said blades.

3. A spinner comprising a rotatably mounted blade and a second blade hingedly connected to said first blade and adapted to rotate thereon upon an axis substantially parallel to the axis of rotation of the first said blade.

4. A spinner comprising a rotatable blade and a second blade rotatably mounted on the first blade, the axes of the two blades being substantially parallel.

5. A device of the character described, comprising a planetary system of spinners, i. e., comprising a main spinner, and a secondary spinner carried thereon and having an independent rotary motion concurrently with the rotation of the main spinner.

6. A spinner of the character described, comprising a plurality of blades rotatable about a major axis and a plurality of blades revolvable about said major axis and rotatable about minor axes.

CHARLES T. PFLUEGER.